United States Patent
Igarashi

(10) Patent No.: US 8,490,645 B2
(45) Date of Patent: Jul. 23, 2013

(54) PRESSURE SENSOR, PRESSURE-DIFFERENTIAL FLOW RATE METER, AND FLOW RATE CONTROLLER

(75) Inventor: Hiroki Igarashi, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 256 days.

(21) Appl. No.: 13/028,275

(22) Filed: Feb. 16, 2011

(65) Prior Publication Data

US 2011/0214757 A1 Sep. 8, 2011

(30) Foreign Application Priority Data

Mar. 5, 2010 (JP) ................................. 2010-048903

(51) Int. Cl.
  *F16K 31/126* (2006.01)
(52) U.S. Cl.
  USPC ........ 137/486; 137/487.5; 137/488; 137/808; 73/861.42; 73/715; 73/756
(58) Field of Classification Search
  USPC .... 137/486, 487.5, 488, 487, 808; 73/861.42, 73/715, 756
  See application file for complete search history.

(56) References Cited

U.S. PATENT DOCUMENTS

| | | | | |
|---|---|---|---|---|
| 2,370,965 A * | 3/1945 | Kahn | ................................ | 138/46 |
| 2,486,133 A * | 10/1949 | Egger | ............................... | 138/41 |
| 3,818,765 A * | 6/1974 | Eriksen | ............................. | 73/706 |
| 4,454,758 A * | 6/1984 | Miller | ................................ | 73/202 |
| 4,462,409 A * | 7/1984 | Pace et al. | ...................... | 600/488 |
| 4,505,157 A * | 3/1985 | Hong Le | ........................ | 73/756 |
| 4,516,430 A * | 5/1985 | Kurtz et al. | ...................... | 73/727 |
| 5,347,868 A * | 9/1994 | Shigesada et al. | ............... | 73/715 |
| 5,510,817 A * | 4/1996 | Sohn | ................................ | 347/21 |
| 5,942,694 A * | 8/1999 | Robins et al. | ................... | 73/756 |
| 6,117,086 A * | 9/2000 | Shulze | ........................... | 600/488 |
| 6,578,435 B2 * | 6/2003 | Gould et al. | ................ | 73/861.52 |
| 6,820,490 B2 * | 11/2004 | Mittelstein et al. | ............. | 73/715 |
| 7,422,028 B2 * | 9/2008 | Nugent et al. | ................. | 137/487 |
| 7,472,608 B2 * | 1/2009 | Hedtke | ........................ | 73/861.63 |
| 7,610,117 B2 * | 10/2009 | Brodeur et al. | ................. | 700/281 |
| 7,942,069 B2 * | 5/2011 | Peterson | ..................... | 73/861.52 |
| 2004/0129084 A1 * | 7/2004 | Ikeda | ................................ | 73/716 |
| 2005/0189018 A1 * | 9/2005 | Brodeur et al. | ............ | 137/487.5 |
| 2007/0089788 A1 * | 4/2007 | Chinnock et al. | ........... | 137/487.5 |
| 2009/0000390 A1 * | 1/2009 | Duhanyan et al. | .......... | 73/861.04 |
| 2009/0127483 A1 * | 5/2009 | Peterson | ......................... | 251/12 |
| 2010/0200083 A1 * | 8/2010 | Kouchi et al. | ................. | 137/486 |
| 2010/0307254 A1 * | 12/2010 | Klosinski et al. | ............... | 73/756 |

FOREIGN PATENT DOCUMENTS

JP      05-233068 A      9/1993

* cited by examiner

*Primary Examiner* — John Rivell
*Assistant Examiner* — Minh Le
(74) *Attorney, Agent, or Firm* — Robert P. Michal; Lucas & Mercanti, LLP

(57) ABSTRACT

In a pressure sensor that detects the pressure of liquid flowing in a main fluid flow path, a pressure measuring unit is installed by providing a pressure measuring space at a position branching from a straight-pipe portion of the main fluid flow path, and, in addition, the main fluid flow path and the pressure measuring space are connected with an inlet pipe and an outlet pipe whose pipe diameters are smaller than the main fluid flow path.

6 Claims, 7 Drawing Sheets

PRESSURE SENSOR, PRESSURE-DIFFERENTIAL FLOW RATE METER, AND FLOW RATE CONTROLLER

CROSS REFERENCE TO RELATED APPLICATIONS

This application claims benefit of Japanese Application No. 2010-048903 filed in Japan on Mar. 5, 2010, the contents of which are hereby incorporated by its reference.

BACKGROUND OF THE INVENTION

1. Field of the Invention

The present invention relates to a pressure sensor for detecting liquid pressure and also relates to a pressure-differential flow rate meter and a flow rate controller provided with this pressure sensor.

2. Description of Related Art

In the related art, there are known pressure-differential flow rate meters in which an orifice plate is installed somewhere in a piping flow path, and the flow rate of liquid is measured by measuring a pressure difference between an upstream side and a downstream side of the orifice plate. In addition, there is a known flow rate controller that adjusts the degree of opening of an electrically actuated valve or the like on the basis of the flow rate detected by a pressure-differential flow rate meter to thereby perform control so as to maintain a predetermined flow rate (for example, see Japanese Unexamined Patent Application, Publication No. Hei 5-233068).

In the above-described pressure-differential flow rate meter, for example, as shown in FIG. 8, a pressure sensor 1 that detects liquid pressure is configured with a pressure measuring unit 4 disposed at a distal end of a pressure inlet pipe 3 which is branched in a T-shape from a main fluid flow path 2.

In addition, in some cases, the above-described pressure sensor 1 handles, for example, a high-temperature fluid of 80° C. or higher or a fluid that pulsates in a flow path; furthermore, the sensor may be affected by fluid hammer, depending on the configuration of the main fluid flow path 2. Therefore, in order to maintain preferable measurement conditions for the pressure sensor 1, it is necessary to devise damage reduction measures, such as measures against high-temperature fluids, fluid pulsation, or fluid hammer, in accordance with the installation conditions of the pressure sensor 1 and the state of the fluids (fluid type, temperature condition, or the like).

In conventional pressure sensors, as in a pressure sensor 1' shown in FIG. 9, specific damage reduction measures include, for example, reducing the pipe diameter of a pressure inlet pipe 3A, making the pressure inlet pipe 3A longer to separate the pressure measuring unit 4 from the main fluid flow path 2, or a combination thereof.

In some cases, the above-described pressure sensor is used in a piping flow path in which a high-purity reagent and purified water alternately flow, for example, as in a semiconductor manufacturing apparatus. In the case of such a semiconductor manufacturing apparatus, cleanness of the liquid used and uniformity of wafer processing are critical; therefore, liquid displaceability in the piping flow path is extremely important. That is, when the fluid to be flowed in the piping flow path is changed, any residue of the previously used fluid will cause a loss of cleanness; therefore, it is necessary to perform complete displacement by washing until there is no residual liquid remaining.

However, when performing displacement by washing, the damage reduction measures described above form a relatively large dead volume where the previously used liquid tends to be retained. In particular, the pressure inlet pipe, which is long and narrow, is a space that becomes a dead volume where displacement is difficult during washing; therefore, in order to enable application to, for example, a semiconductor manufacturing apparatuses, the above-described damage reduction measures need to be improved.

BRIEF SUMMARY OF THE INVENTION

The present invention has been conceived in light of the above-described circumstances, and an object thereof is to provide a pressure sensor that is capable of easily and completely displacing liquid by washing, etc. and that is provided with damage reduction measures, and, additionally, to provide a pressure-differential flow rate meter and a flow rate controller that are constituted using this pressure sensor.

The present invention employs the following solutions in order to solve the above-described problems.

A pressure sensor according to the present invention is a pressure sensor that detects the pressure of liquid flowing in a main fluid flow path, wherein a pressure measuring unit is installed by providing a pressure measuring space at a position branching from a straight-pipe portion of the main fluid flow path, and the main fluid flow path and the pressure measuring space are connected with an inlet pipe and an outlet pipe whose pipe diameters are smaller than the main fluid flow path.

With the pressure sensor of the present invention, because the main fluid flow path and the pressure measuring space are connected via the inlet pipe and the outlet pipe whose pipe diameters are smaller than the main fluid flow path, a circulating flow path, which flows bypassing the main fluid flow path, is formed for the liquid that flows into the pressure measuring space. That is, a dead volume is not formed in the flow path that connects between the main fluid flow path and the pressure measuring space.

Accordingly, when washing the main fluid flow path and the pressure sensor, a flow of liquid is generated inside the pressure measuring space, thereby making it possible to reliably displace the fluid inside. In addition, because the inlet pipe and the outlet pipe have smaller pipe diameters than the main fluid flow path, it is possible to alleviate pulsation and fluid hammer reaching the pressure measuring space.

Furthermore, the pressure measuring unit installed in the pressure measuring space normally has a fluorocarbon polymer (PFA) sheet interposed between the fluid and pressure-receiving surface so as to avoid contact therebetween. Accordingly, alleviating the above-described pulsation or fluid hammer is also effective to prevent floating of the fluorocarbon polymer sheet, which affects the detection accuracy. Such prevention of floating of the fluorocarbon polymer sheet is particularly effective when handling high-temperature liquid.

In the above-described invention, a branching angle $\theta_1$ at which the inlet pipe branches from the main fluid flow path and a joining angle $\theta_2$ at which the outlet pipe joins the main fluid flow path preferably are both acute angles; accordingly, a smooth fluid flow is formed from the main fluid flow path to the pressure measuring space and thereafter from the pressure measuring space to the main fluid flow path.

In the above-described invention, the main fluid flow path preferably is provided with an enlarged-diameter portion at the branching position of the inlet pipe; by doing so, the displacement performance of the pressure measuring space is further enhanced by the action of the Venturi tube.

In the above-described invention, an exit opening of the inlet pipe and an entrance opening of the outlet pipe connected to the pressure measuring space preferably are disposed at positions where they are mutually offset from an axial center line of the main fluid flow path; by doing so, the displacement performance can be enhanced by forming a swirling flow in the pressure measuring space.

In the above-described invention, a bottom surface of the pressure measuring space preferably is formed as a convex surface sloping down toward the exit opening of the inlet pipe and the entrance opening of the outlet pipe; by doing so, the liquid in the pressure measuring space can be made to reliably flow out to the main fluid flow path.

A pressure-differential flow rate meter according to the present invention is a pressure-differential flow rate meter that includes an orifice disposed between a pair of pressure sensors provided in a straight-pipe portion of a main fluid flow path, that measures flow rate by converting a pressure difference obtained from two pressure values detected by the pressure sensors, and that employs pressure sensors according to claim 1 as the pressure sensors.

With the above-described pressure-differential flow rate meter of the present invention, because the pressure sensor employed therein is the above-described pressure sensor, the internal liquid can reliably be displaced when washing the main fluid flow path and the pressure sensor. In addition, because the inlet pipe and the outlet pipe have smaller pipe diameters than the main fluid flow path, it is possible to alleviate the pulsation and the fluid hammer reaching the pressure measuring space.

A flow rate controller according to the present invention is a flow rate controller including the pressure-differential flow rate meter described above and a flow-rate adjusting valve that is provided in the main fluid flow path, and the degree of opening thereof is controlled so that differences between flow rate values measured by the pressure-differential flow rate meter and a set flow rate value determined in advance fall within a predetermined range.

With the above-described flow rate controller, because the above-described pressure-differential flow rate meter is provided, the internal liquid can reliably be displaced when washing the main fluid flow path and the pressure sensor. In addition, because the inlet pipe and the outlet pipe have smaller pipe diameters than the main fluid flow path, it is possible to alleviate pulsation and the fluid hammer reaching the pressure measuring space.

With the present invention described above, it is possible to provide a pressure sensor that is capable of easily and completely displacing liquid by washing, etc. and that is provided with damage reduction measures. In other words, the pressure sensor of the present invention alleviates damage to the pressure measuring unit caused by pulsation or fluid hammer and, moreover, does not form a dead volume where liquid is retained during washing or liquid displacement.

In addition, the pressure-differential flow rate meter and the flow rate controller constituted employing the pressure sensor are capable of easily and completely displacing liquid by washing, etc. and, moreover, include damage reduction measures that alleviate damage to the pressure measuring unit caused by pulsation or fluid hammer.

DETAILED DESCRIPTION OF THE INVENTION

An embodiment of a pressure sensor, a pressure-differential flow rate meter, and a flow rate controller according to the present invention will be described below on the basis of the drawings.

Figure 1A:
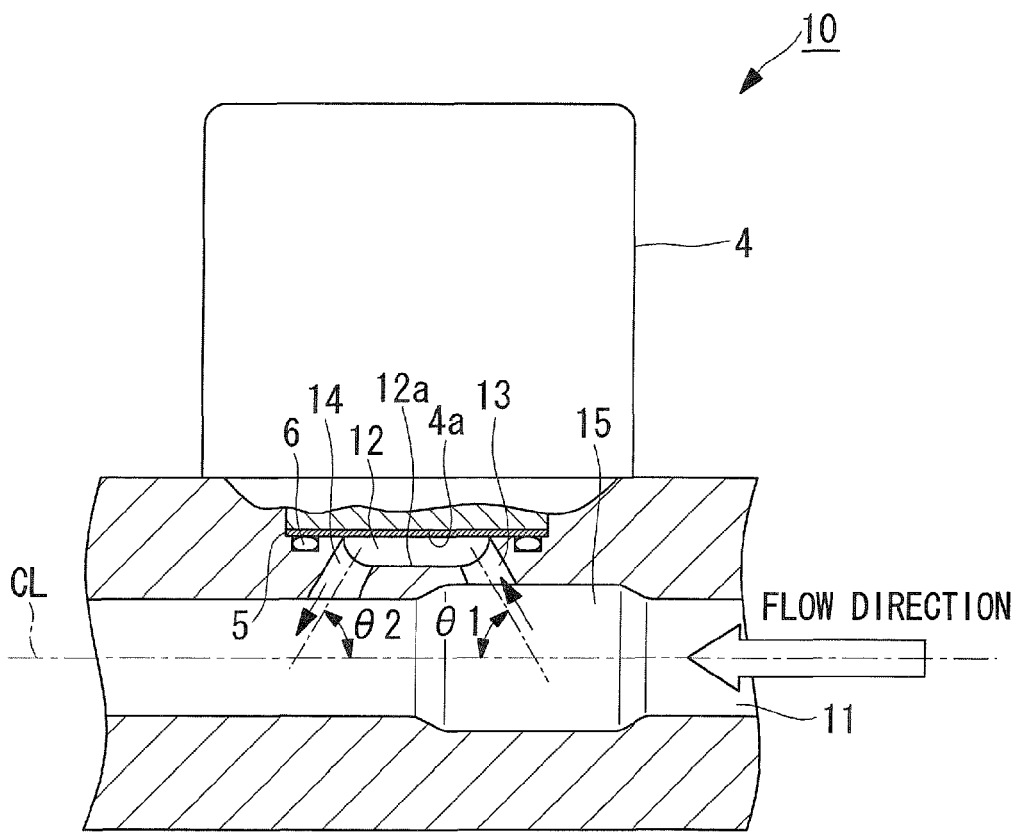
FIG. 1A is a cross-sectional view of relevant portions showing the internal structure of an embodiment of a pressure sensor according to the present invention.
Figure 2:
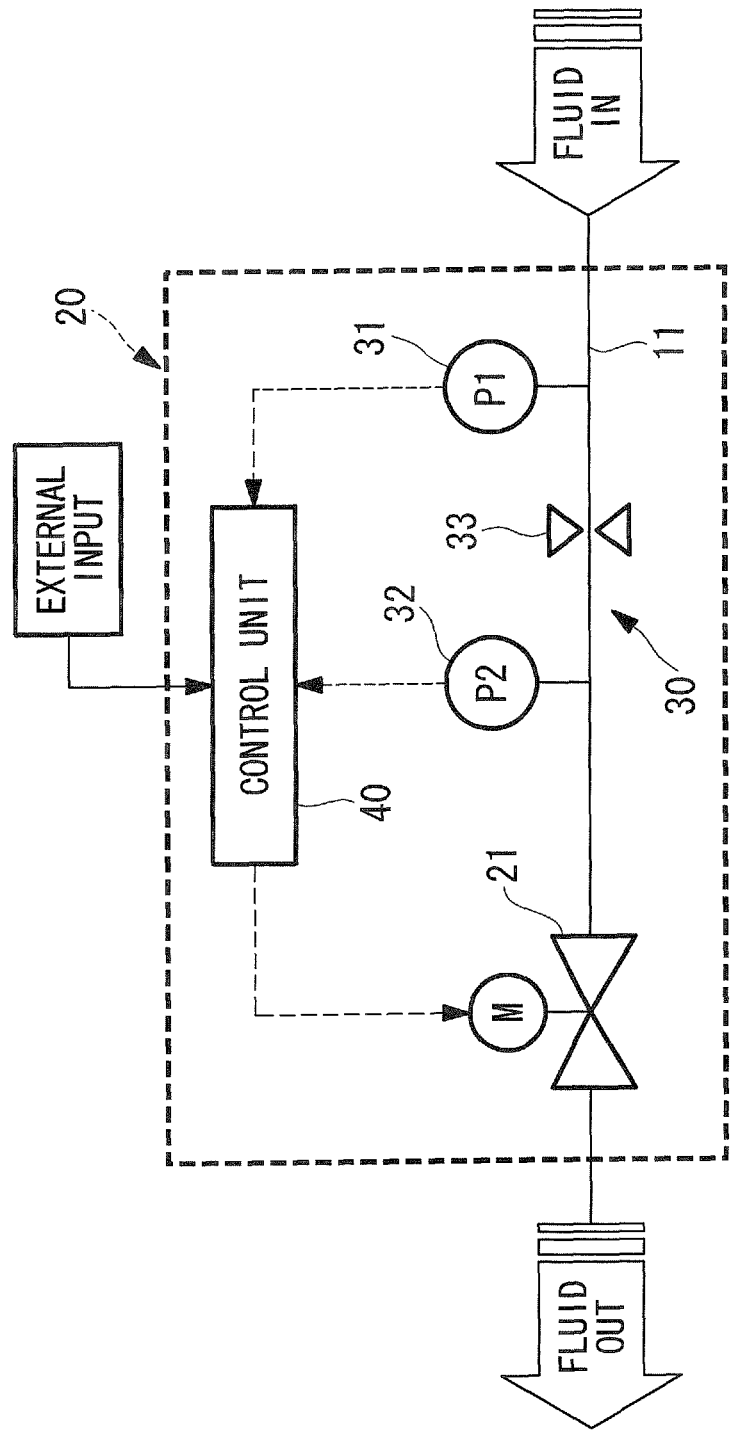
FIG. 2 is a system diagram showing an example configuration of a pressure-differential flow rate meter and a flow rate controller according to the present invention.

Pressure sensors 10 shown in FIG. 1A are installed in, for example, a straight-pipe portion of a main fluid flow path 11 formed of a piping system or the like, to detect the pressure of liquid that flows in the main fluid flow path 11. The pressure sensors 10 described above not only detect pressure by being installed at appropriate locations in the main fluid flow path 11 but are also installed, for example, in a flow rate controller 20 shown in FIG. 2 at an upstream side and a downstream side of an orifice 33, as pressure-difference-detecting pressure sensors 31 and 32 that constitute a pressure-differential flow rate meter 30.

The flow rate controller 20 is equipped with the pressure-differential flow rate meter 30 and a flow-rate adjusting valve 21, such as an electrically actuated valve, that is provided in the main fluid flow path 11. The flow rate controller 20 is a device that controls the degree of opening of the flow-rate adjusting valve 21 so that a difference between a flow rate value measured by the pressure-differential flow rate meter 30 and a set flow rate value determined in advance falls within a predetermined range.

The illustrated flow rate controller 20 is provided with a control unit 40 that includes a flow-rate calculating unit for the pressure-differential flow rate meter 30 and a flow-rate control unit for the flow rate controller 20.

The flow-rate calculating unit for the pressure-differential flow rate meter 30 is a control unit that calculates measured flow rate values by receiving pressure value signals detected respectively by the pressure-difference-detecting pressure sensors 31 and 32.

The flow-rate control unit is a control unit that receives measured flow rate value signals obtained at the flow-rate calculating unit and calculates degree-of-opening adjusting signals on the basis of differences between the measured flow rate values and the set flow rate value, to thereby control the degree of opening of the flow-rate adjusting valve 21 using the degree-of-opening adjusting signals.

Therefore, the above-described flow-rate calculating unit and the flow-rate control unit may be configured as independent control units or as a control unit 40 by integrating both of them.

More specifically, when used as the pressure-differential flow rate meter 30 for simply measuring flow rates, it is sufficient to provide the flow-rate calculating unit alone; however, when used as the flow-rate controller 20, the flow-rate calculating unit and the flow-rate control unit are both required, and therefore, the two separate control units should be configured with an electrical connection therebetween, or the control unit 40 in which the two control units are integrated should be provided.

With regard to the pressure sensors 10 shown in FIG. 1A, in this embodiment, a pressure measuring space 12 is provided at a position branched from the straight-pipe portion of the main fluid flow path 11, and a pressure measuring unit 4, which is the sensor main unit, is installed at the pressure measuring space 12. Additionally, the main fluid flow path 11 and the pressure measuring space 12 are connected via an inlet pipe 13 and an outlet pipe 14 whose pipe diameters are smaller than the main fluid flow path 11. Therefore, the pressure sensor 10 includes a bypass flow path in which fluid flowing in the main fluid flow path 11 is diverted from the main fluid flow path 11 via the inlet pipe 13 and the outlet pipe 14, thereby flowing through the pressure measuring space 12.

The illustrated pressure measuring space 12 is a bowl-shaped space which is open at the top and flat at the bottom surface 12a.

Figure 1B:
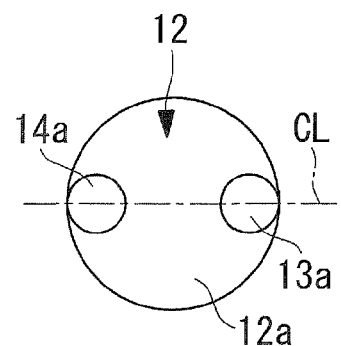
FIG. 1B is a plan view of a pressure measuring space viewed from a pressure measuring unit (sensor main unit) side.

In addition, as shown in FIG. 1B, the pressure measuring space 12 has a circular shape in a plan view with its center on an axial center line CL of the main fluid flow path 11. Furthermore, the inlet pipe 13 and the outlet pipe 14 are both branching flow paths with circular cross-sectional shapes, and an exit opening 13a of the inlet pipe 13 and an entrance opening 14a of the outlet pipe 14, which are connected to the pressure measuring space 12, are both disposed on the axial center line CL.

In this embodiment, it is desirable that a branching angle $\theta 1$ at which the inlet pipe 13 branches from the main fluid flow path 11 and a joining angle $\theta 2$ at which the outlet pipe 14 joins the main fluid flow path 11 both be acute angles of 90° or less. The branching angle $\theta 1$ and the joining angle $\theta 2$ set at the acute angles in this way make fluid smoothly flow from the main fluid flow path 11 to the pressure measuring space 12, and then from the pressure measuring space 12 to the main fluid flow path 11. That is, the inlet pipe 13 smoothly branches off without drastically changing direction from the flow direction of the fluid flowing in the main fluid flow path 11, and the outlet pipe 14 smoothly joins without drastically changing direction relative to the flow direction of the fluid flowing in the main fluid flow path 11.

Note that, so long as the above-described inlet pipe 13 and the outlet pipe 14 connect the main fluid flow path 11 and the pressure measuring space 12, the branching angle $\theta 1$ and the joining angle $\theta 2$ are not particularly limited to acute angles.

When installing the pressure measuring unit 4 from above at the top opening of the pressure measuring space 12, in order to avoid contact between the fluid and a pressure-receiving surface 4a, a fluorocarbon polymer (PFA) sheet 5 is typically interposed therebetween in consideration of the fluid properties, materials of the pressure-receiving surface 4a, and so on. Note that, reference numeral 6 in the figure is an O-ring that provides sealing so that the fluid in the pressure measuring space 12 does not leak from the installation surface of the pressure measuring unit 4.

In addition, the main fluid flow path 11 in this embodiment preferably has an enlarged-diameter portion 15 provided at a branching position of the inlet pipe 13. The enlarged-diameter portion 15 is formed by partially enlarging the inner diameter of the main fluid flow path 11, which has a circular cross-sectional shape, and serves as a Venturi tube formed in the main fluid flow path 11. It is most effective to provide the enlarged-diameter portion 15 described above at the branching position of the inlet pipe 13 in the main fluid flow path 11.

By providing the above-described enlarged-diameter portion 15 at the branching position of the inlet pipe 13, the effect of the Venturi tube generates a pressure difference in the main fluid flow path 11, in which an incompressible fluid flows, between an upstream side and a downstream side of the pressure measuring space 12; therefore, the pressure at the enlarged-diameter portion 15, where the flow speed is reduced, becomes greater than the downstream side of the pressure measuring space 12. That is, because a flow is formed from the enlarged-diameter portion 15 where the pressure is higher to the downstream side of the pressure measuring space 12 where the pressure is lower, the liquid in the pressure measuring space 12 is also smoothly displaced by passing through the inlet pipe 13 and the outlet pipe 14, and thus, the displacement performance is further enhanced as compared with the case in which the enlarged-diameter portion 15 is not provided.

Note that, the above-described enlarged-diameter portion 15 is not an essential constituent element of the pressure sensors 10 of this embodiment, and it may be appropriately provided as needed.

Figure 3:
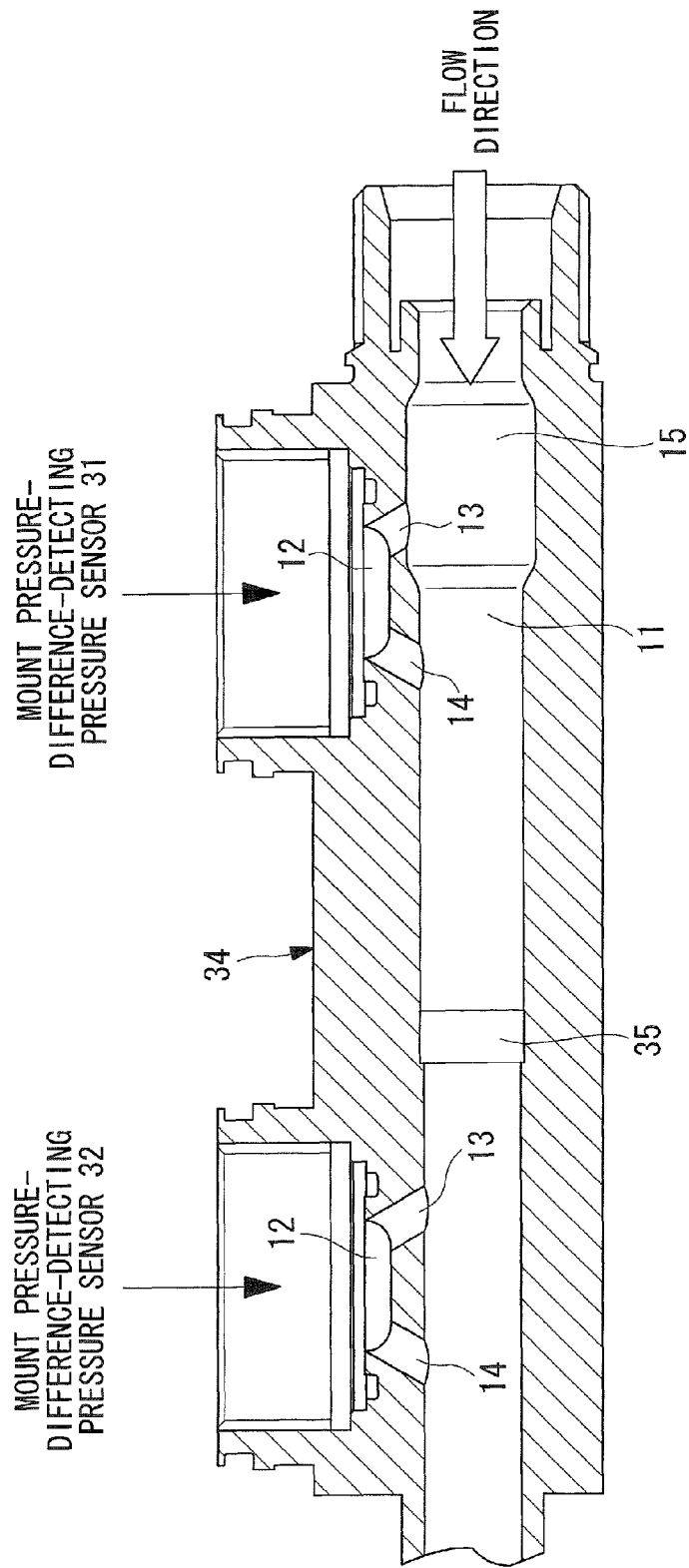
FIG. 3 is a cross-sectional view showing an example configuration of a body (main fluid flow path) that constitutes the pressure-differential flow rate meter.

FIG. 3 is a cross-sectional view showing an example configuration of a body of the pressure-differential flow rate meter 30, and the pressure-difference-detecting pressure sensors 31 and 32 are respectively provided on the upstream side and the downstream side of the orifice 33.

In this case, the pressure sensor 10 shown in FIG. 1A is used as the pressure-difference-detecting pressure sensor 31 on the upstream side of the orifice 33. Therefore, a body 34 of the pressure-differential flow rate meter 30 shown in FIG. 3 is configured such that the pressure sensor 10 having the enlarged-diameter portion 15 at the branching position of the inlet pipe 13 is installed as the pressure-difference-detecting pressure sensor 31 to be installed on the upstream side of the orifice 33. Accordingly, the main fluid flow path 11 provided with the enlarged-diameter portion 15 at the branching position of the inlet pipe 13 is formed for the pressure-difference-detecting pressure sensor 31. Note that, the reference numeral 35 in the figure is an installation space for the orifice 33.

However, because the body 34 has the main fluid flow path 11 without the enlarged-diameter portion 15 for the pressure-difference-detecting pressure sensor 32 to be installed on the downstream side of the orifice 33, the pressure-difference-detecting pressure sensor 32 in this case is a pressure sensor similar to the above-described pressure sensor 10 with respect to structures other than the enlarged-diameter portion 15. This is because a pressure difference is less readily generated in the pressure-differential flow rate meter 30 at the downstream side of the orifice 33 as compared with the upstream side thereof.

With the thus-configured pressure sensor 10, because the main fluid flow path 11 and the pressure measuring space 12 are connected via the inlet pipe 13 and the outlet pipe 14 whose pipe diameters are smaller than the main fluid flow path 11, a circulating flow path is formed for the liquid that flows into the pressure measuring space 12. The circulating flow path is the bypass flow path in which the liquid that flows into the pressure measuring space 12 flows bypassing the main fluid flow path 11. That is, because the inlet pipe 13 and the outlet pipe 14 that connect the main fluid flow path 11 and the pressure measuring space 12 serve as the circulating flow path that bypasses the main fluid flow path 11, a fluid flow that flows via the pressure measuring space 12 is formed. As a result, dead volume where fluid is retained does not form in the pressure measuring space 12, the inlet pipe 13, or the outlet pipe 14.

Accordingly, when washing the main fluid flow path 11 and the pressure sensor 10 for changing the fluid to be used, etc., liquid flow always occurs in the pressure measuring space 12, and therefore, it is possible to reliably displace the liquid inside.

Figure 9:
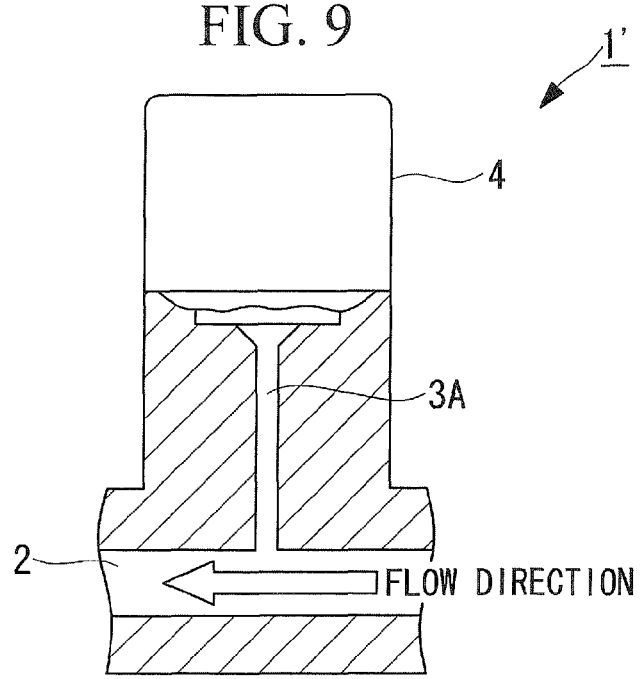
FIG. 9 is a cross-sectional view of relevant portions showing the internal structure of a pressure sensor provided with damage reduction measures (conventional example).

In addition, because the pipe diameters of the inlet pipe 13 and the outlet pipe 14 are smaller than the main fluid flow path 11, pulsation or fluid hammer reaching the pressure measuring space 12 can be alleviated similarly to the case of the pressure inlet pipe 3A in FIG. 9. Such alleviation of pulsation or fluid hammer is also effective as a preventive measure against floating of the fluorocarbon polymer sheet 5 that affects detection accuracy, particularly when handling high-temperature liquid.

Figure 4:
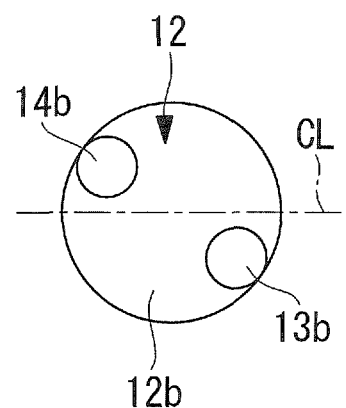
FIG. 4 is a plan view of the pressure measuring space viewed from the pressure measuring unit (sensor main unit) side and is a diagram showing a modification of FIG. 1B.
Figure 8:
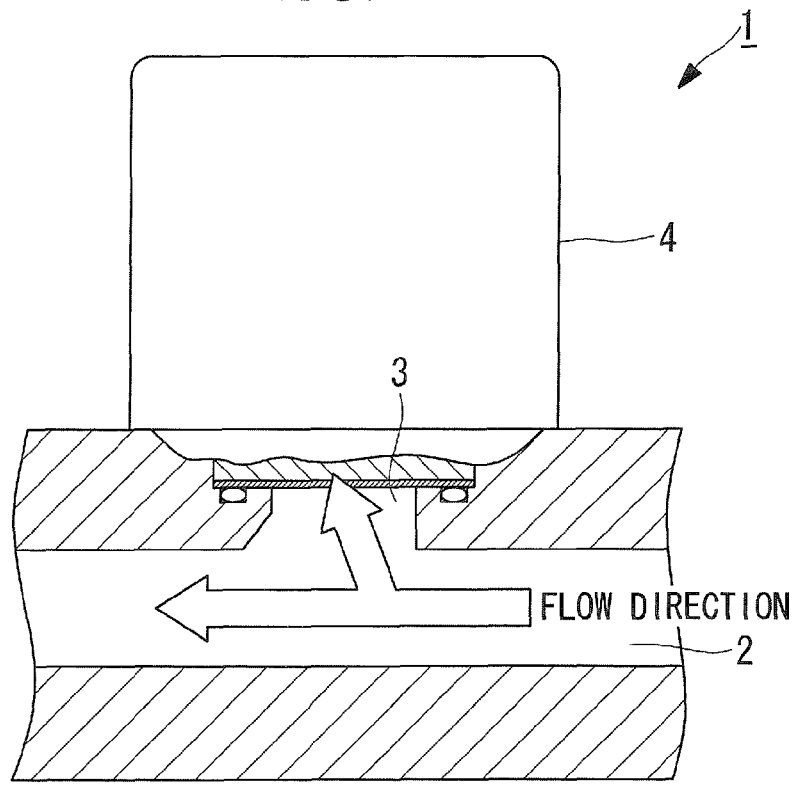
FIG. 8 is a cross-sectional view of relevant portions showing the internal structure of a typical pressure sensor (conventional example).

FIG. 4 shows a test device 50 for comparing the pressure sensor 10 of this embodiment described above with a conventional structure having the liquid displacement performance shown in FIG. 8.

The test device 50 is used to conduct comparative tests for the liquid displacement performance between purified water and saline water; fluid to be flowed in a conventional pressure sensor 1 or the pressure sensor 10 of this embodiment is switched with a three-way valve 51 to thereby measure the change over time in specific resistance using a resistivity meter 52. In other words, the test device 50 operates the three-way valve 51 to allow the purified water to flow after the saline water has been flowed and measures the amount of time elapsed to achieve the specific resistance for the purified water (16.7 MΩ·cm), which indicates that the saline water has been displaced by the purified water.

Figure 6:
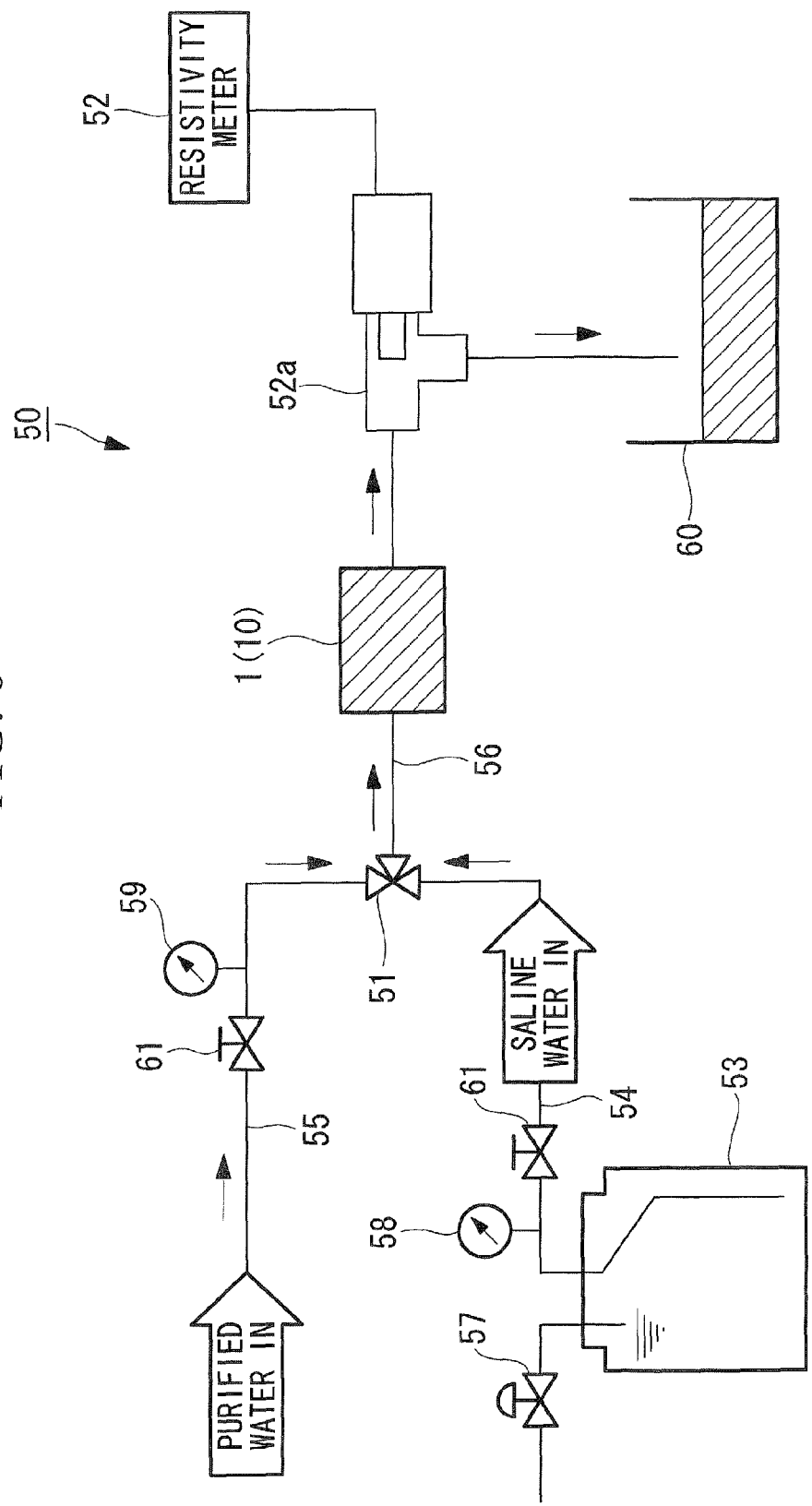
FIG. 6 is a system diagram showing a purified water/saline water displacement test device for evaluating displacement performance with regard to the pressure sensor of the present invention.

In FIG. 6, the saline water is guided to the three-way valve 51 from a saline water tank 53 via a saline water pipe 54 using air pressure, and the purified water is guided to the three-way valve 51 via a purified water pipe 55. The three-way valve 51 is connected at its downstream side to a fluid piping 56 where the pressure sensor 1 and the pressure sensor 10 are installed in sequence.

Note that, in the figure, the reference numeral 52a is a resistivity measuring unit that measures the resistivity of liquid, 57 is a regulator that adjusts the air pressure, 58 is a pressure meter that measures the liquid pressure of the fed saline solution, 59 is a pressure meter that measures the liquid pressure of the fed purified water, 60 is a liquid collection tank, and 61 is an open/close valve.

Figure 7:
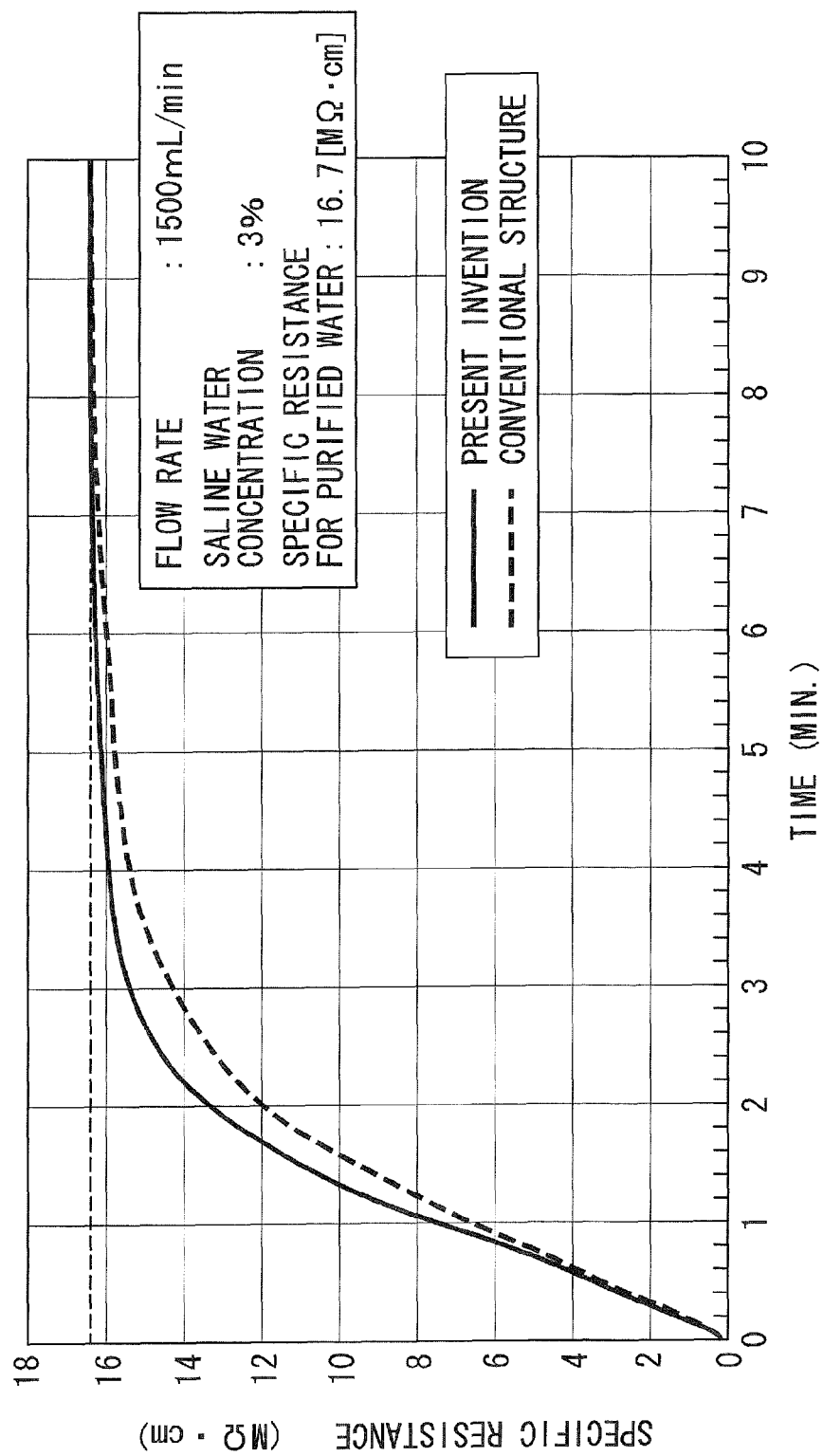
FIG. 7 is a diagram showing results of a displacement performance test performed using the test device in FIG. 6.

FIG. 7 shows results of a test conducted using the test device 50 described above; the broken line indicates the case where the conventionally structured pressure sensor 1 is installed and the solid line indicates the case where the pressure sensor 10 of this embodiment is installed.

The test conditions are as follows.
1) Filled fluid: saline water (3% concentration)
2) Displacement fluid: purified water
3) Fluid temperature: 25° C.
4) Environmental temperature: room temperature
5) Flow rate setting for purified water: 1500 L/min (at 150 kPa feeding pressure)
6) Specific resistance of purified water (reference value): 16.7 MΩ·cm
7) Flow-through pressure of saline water: 200 kPa
8) Installation direction: horizontal For both of the employed pressure sensors 1 and 10, the inner diameters of the main fluid flow paths 2 and 11 are 8 mm, and the enlarged-diameter portion 15 with an inner diameter of 10 mm is provided in the pressure sensor 10 of this embodiment, whereas an enlarged-diameter portion is not provided in the conventional pressure sensor 1.

In addition, the pressure sensor 1 is provided with a pressure inlet pipe (branching flow path) 3 with an inner diameter of 10 mm, whereas the pressure sensor 10 is provided with the inlet pipe 13 and the outlet pipe 14 having inner diameters of 3 mm.

Note that, for both of the employed pressure sensors 1 and 10, the usage temperature ranges are between 20 and 60° C.

According to the test results, by comparing the broken line for the conventional structure and the solid line for this embodiment, the amount of time required for the specific resistance to reach the reference value of 16.7 MO·cm, that is, the amount of time required for the saline water to be displaced by the purified water, is shown to be reduced at least from 7 to 8 minutes to about 5 to 6 minutes. Therefore, the pressure sensor 10 of this embodiment is capable of easily and completely displacing liquid through washing, etc., in addition to providing damage reduction measures against pulsation and fluid hammer through the inlet pipe 13 and the outlet pipe 14 whose diameters are smaller than the main fluid flow path 11. In other words, the pressure sensor 10 of this embodiment exhibits equivalent or better displacement performance as compared with the conventional example shown in FIG. 8, which is not provided with damage reduction measures, and is additionally provided with satisfactory damage reduction measures against pulsation or fluid hammer.

Furthermore, although omitted from the drawings, for the pressure sensor 10 without the enlarged-diameter portion 15, its test result showed that displacement of the saline water with the purified water requires about 15 minutes. This test result indicates that complete displacement is achieved although it takes somewhat longer time. Therefore, the pressure sensor 10 that does not have the enlarged-diameter portion 15 in the main fluid flow path 11 does not form dead volume due to the damage reduction measures, unlike, for example, the case of the pressure inlet pipe 3A shown in the conventional example in FIG. 9.

Incidentally, the above-described inlet pipe 13 and the outlet pipe 14 may be configured, for example, as in a first modification shown in FIG. 4. That is, in this first modification, an exit opening 13b of the inlet pipe 13 and an entrance opening 14b of the outlet pipe 14 that are connected to the pressure measuring space 12 are disposed at positions where they are mutually offset from the axial center line CL of the main fluid flow path 11.

By employing the above-described placement of the exit opening 13b and the entrance opening 14b, the fluid that has flowed into the pressure measuring space 12 from the inlet pipe 13 flows out from the outlet pipe 14 while forming a swirling flow in the pressure measuring space 12. As a result, the liquid in the pressure measuring space 12 flows out in a turbulent manner due to the swirling flow formed therein; therefore, it is possible to further enhance the displacement performance.

Figure 5:
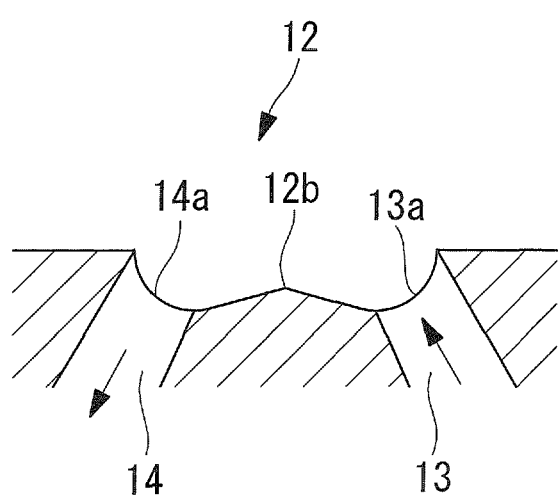
FIG. 5 is a cross-sectional view showing a modification with regard to the shape of the bottom surface of the pressure measuring space.

In addition, with a second modification shown in FIG. 5, a bottom surface 12b of the pressure measuring space 12 is formed as a convex surface that slopes down toward the exit opening 13a of the inlet pipe 13 and the entrance opening 14a of the outlet pipe 14. That is, the bottom surface 12b of the pressure measuring space 12 is formed as a convex surface having the highest point near the center portion thereof; therefore, when the flow in the main fluid flow path 11 stops, the liquid in the pressure measuring space 12 can be made to reliably flow out to the main fluid flow path 11 due to gravity.

With the above-described convex bottom surface 12b, for example, when the liquid to be flowed is reagent or the like that tends to stick, it can be made to reliably flow out of the pressure measuring space 12 even when its flow is stopped; therefore, it is possible to prevent solidified reagent from adhering to the bottom surface 12b and remaining there.

As has been described, with this embodiment and modifications thereof described above, the pressure sensor 10 is capable of easily and completely displacing liquid by washing, etc. and is provided with the damage reduction measures. Accordingly, the above-described pressure sensor 10 alleviates damage to the pressure-receiving surface 4a of the pressure measuring unit 4 or the fluorocarbon polymer sheet 5 caused by pulsation or fluid hammer, and, in addition, does not form a dead volume where liquid is retained when washing or displacing liquid.

In addition, in the pressure-differential flow rate meter 30 and the flow rate controller 20 constituted using the pressure sensor 10, liquid displacement through washing, etc. can be easily and completely executed particularly in the pressure sensor 10, and, in addition, the damage reduction measures that alleviate damage to the pressure measuring unit 4 caused by pulsation or fluid hammer are provided.

Note that, the present invention is not limited to the above-described embodiment, and appropriate alterations are permissible within a range that does not depart from the spirit thereof.

What is claimed is:

1. A pressure sensor that detects pressure of liquid flowing in a main fluid flow path, comprising:
   a pressure measuring unit which is installed by providing a pressure measuring space at a position branching from a straight-pipe portion of the main fluid flow path,
   a circulating flow path that bypasses the main fluid flow path is formed by connecting the main fluid flow path and the pressure measuring space with an inlet pipe and an outlet pipe whose pipe diameters are smaller than the main fluid flow path,
   wherein an exit opening of the inlet pipe and an entrance opening of the outlet pipe connected to the pressure measuring space are disposed at positions where they are mutually offset from an axial center line of the main fluid flow path, and
   the main fluid flow path is provided with an enlarged-diameter portion at the branching position of the inlet pipe.

2. A pressure sensor according to claim 1, wherein a branching angle θ1 at which the inlet pipe branches from the main fluid flow path and a joining angle θ2 at which the outlet pipe joins the main fluid flow path are both acute angles.

3. A pressure sensor according to claim 1 wherein a bottom surface of the pressure measuring space is formed as a convex surface sloping down toward the exit opening of the inlet pipe and the entrance opening of the outlet pipe.

4. A pressure-differential flow rate meter comprising an orifice disposed between a pair of pressure sensors provided in a straight-pipe portion of a main fluid flow path, that measures flow rate by converting a pressure difference obtained from two pressure values detected by the pressure sensors, and that employs pressure sensors according to claim 1 as the pressure sensors.

5. A flow rate controller comprising:
   a pressure-differential flow rate meter according to claim 4 and
   a flow-rate adjusting valve that is provided in the main fluid flow path, and the degree of opening thereof is controlled so that differences between flow rate values measured by the pressure-differential flow rate meter and a set flow rate value determined in advance fall within a predetermined range.

6. A pressure sensor according to claim 1, wherein the exit opening of the inlet pipe and the entrance opening of the outlet pipe are connected via the pressure measuring space.

* * * * *